US012741890B2

(12) United States Patent
Felipe et al.

(10) Patent No.: US 12,741,890 B2
(45) Date of Patent: Sep. 22, 2026

(54) SILICA INHIBITORS FOR SILICA INHIBITION AND DISPERSION

(71) Applicant: Baker Hughes Oilfield Operations LLC, Houston, TX (US)

(72) Inventors: Mary Jane Felipe, Sugar Land, TX (US); Jonathan Vargas, Rosenberg, TX (US); Tomasa Ledesma, Houston, TX (US); Ramakrishna Ponnapati, Houston, TX (US); Sankaran Murugesan, Katy, TX (US); Swamy Margan, Conroe, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 477 days.

(21) Appl. No.: 18/514,945

(22) Filed: Nov. 20, 2023

(65) Prior Publication Data

US 2025/0162910 A1 May 22, 2025

(51) Int. Cl.
*C02F 1/52* (2023.01)
*C02F 1/56* (2023.01)

(52) U.S. Cl.
CPC .............. *C02F 1/5227* (2013.01); *C02F 1/56* (2013.01); *C02F 2303/22* (2013.01)

(58) Field of Classification Search
None
See application file for complete search history.

(56) References Cited

U.S. PATENT DOCUMENTS 5,378,368 A 1/1995 Gill
2018/0345212 A1 12/2018 Legaspi Felipe et al.
2020/0368681 A1 11/2020 Legaspi Felipe et al.
2022/0161201 A1* 5/2022 Soliman ........... B01D 67/00042
(Continued)

FOREIGN PATENT DOCUMENTS

CN 101245140 A 8/2008
CN 101973643 B 12/2012
(Continued)

OTHER PUBLICATIONS

ÂRapid Removal of Pb (II) from Aqueous Solution Using Branched Polyehtylenimine Enhanced Magnetic Carboxymethyl Chitosan Optimized with Response Surface Methodologyâ, Sci. Rep. 2017, 7, 43082 (Year: 2017).*

(Continued)

*Primary Examiner* — Richard C Gurtowski
(74) *Attorney, Agent, or Firm* — Crowe & Dunlevy, P.C.

(57) ABSTRACT

A silica inhibitor is disclosed for inhibiting silica scale formation and dispersing silica. In one aspect, a method for reducing silica levels in an aqueous system involves obtaining a silica inhibitor with a branched polyethylenimine and treating the aqueous system with the silica inhibitor. In another aspect, a method for preparing a silica inhibitor involves obtaining a branched polyethylenimine and protonating the branched polyethylenimine to attain a charged inhibitor with a high-density cationic state. In yet another aspect, a silica inhibitor includes a branched polyethylenimine, a phosphonate, and optionally one or more of a linear (Continued)

polymer based on polyvinyl alcohol, a linear polymer based on polyacrylic acid, and an architectured material.

20 Claims, 2 Drawing Sheets

(56) References Cited

U.S. PATENT DOCUMENTS

2023/0219829 A1* 7/2023 Soliman ............... B01J 37/0232 210/774
2025/0032996 A1* 1/2025 Soliman ............... B01D 71/381

FOREIGN PATENT DOCUMENTS

CN 110548407 A 12/2019
EP 2342304 A1 7/2011

OTHER PUBLICATIONS

Amjad, Z. , et al., "An Evaluation of Silica Scale Control Additives for Industrial Water Systems", Paper No. 08368, Nace Int'l., Corrosion 2008 Conference & Expo, 2002, 1-12.
Pedenaud, Pierre , et al., "Silica Scale Inhibition for Steam Generation in OTSG Boiler", SPE 86934, Mar. 2004, 1-9.

* cited by examiner

SILICA INHIBITORS FOR SILICA INHIBITION AND DISPERSION

FIELD OF THE INVENTION

The present application is generally directed at chemical formulations, and in particular to silica inhibitors and methods for preparing such silica inhibitors.

BACKGROUND OF THE INVENTION

Managing silica scale formation is a challenging task. Colloidal silica and metallic silicates, such as calcium silicate (Ca—$SiO_4$) and magnesium silicate (Mg—$SiO_4$), both contribute to silica scale formation. Scaling is further exacerbated by silica polymerization. For example, FIG. 1 illustrates the polymerization of silicic acid ($Si(OH)_4$) to form silica ($SiO_2$) particles, which become suspended as colloidal silicas in a liquid phase.

Current products for silica inhibition include polyamino polyether methylene phosphonic acid (PAPEMP) phosphonate or multifunctional polymers with a molecular weight of less than 10,000 g/mol, such as acrylate copolymer AA-AMPS or acrylate terpolymers. Although these materials can be effective at inhibiting silica when it is present at less than 300 ppm, there are no methods for effective silica inhibition at silica levels greater than 300 ppm. Current inhibitors therefore fail to address environments in which levels of silica are commonly higher than 300 ppm, such as within once-through steam generator (OTSG) applications.

A need therefore exists for a silica inhibitor and dispersant that are effective at addressing silica formation at silica levels greater than 300 ppm. The present disclosure is directed at these and other deficiencies in the prior art.

SUMMARY OF THE INVENTION

In some embodiments, a method is disclosed for reducing silica levels in an aqueous system, where the method includes the steps of obtaining a silica inhibitor and treating the aqueous system with the silica inhibitor. The silica inhibitor includes a branched polyethylenimine.

In other embodiments, a method is disclosed for preparing a silica inhibitor. The method involves obtaining a branched polyethylenimine and protonating the branched polyethylenimine to attain a charged inhibitor with a high-density cationic state.

In yet other embodiments, a silica inhibitor is disclosed, where the silica inhibitor includes a branched polyethylenimine and a phosphonate.

BRIEF DESCRIPTION OF THE DRAWINGS

The above and other objects and advantages of this invention may be more clearly seen when viewed in conjunction with the accompanying drawing wherein.

DETAILED DESCRIPTION

Figure 1:
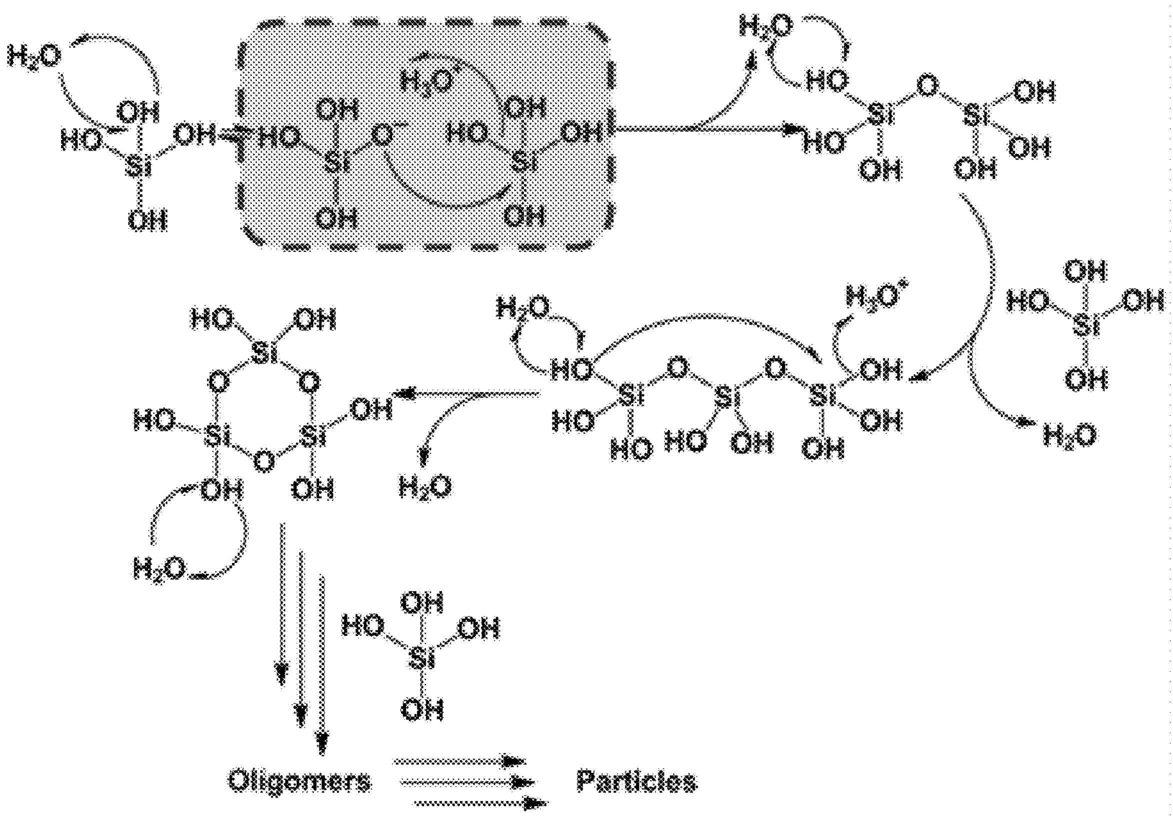
FIG. 1 depicts a common mechanism responsible for silica formation.

Disclosed herein are formulations and processes for reducing silica levels and inhibiting the formation of silica scales in various systems. It has been discovered that a silica inhibitor can be used to reduce and inhibit silica by dispersing colloidal silica and silica particles.

In exemplary embodiments, a silica inhibitor includes polyethylenimine, where the polyethylenimine is either in linear or branched form. In various embodiments, the polyethylenimine is a dendrimer of generation 1, 2, 3, 4, 5, or 6. In one embodiment, the polyethylenimine is a branched polyethylenimine of formula (i):

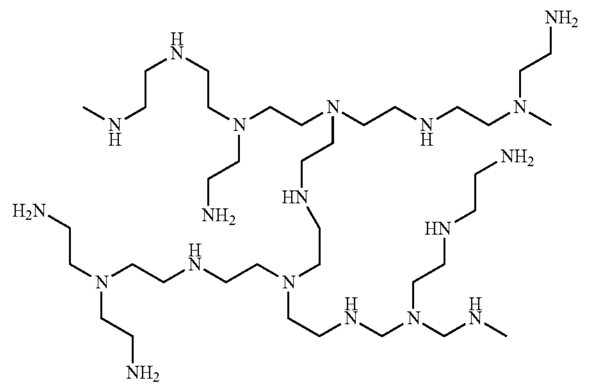 [SMILES: CNCCNCCN(CCN)CCN(CCNCCN(C)CCN)CCNCCN(CCNCCN(CCN)CCN)CCNCN(CCNCCN)CNC]

The polyethylenimine in the silica inhibitor has a molecular weight of between about 300 g/mol to about 100,000 g/mol. In one embodiment, the molecular weight of the polyethylenimine is between about 600 g/mol to about 1,800 g/mol. In another embodiment, the molecular weight is about 1,200 g/mol.

To facilitate interactions with silica particles, it is preferred for the polyethylenimine to have a high charge density. In some embodiments, the polyethylenimine is protonated to attain a charged inhibitor with a high-density cationic state. Protonation of the polyethylenimine's branched chains may be accomplished, for example, at a pH of less than 10.5. The branched polyethylenimine of one embodiment includes at least one protonated primary amine and at least one protonated secondary amine. In one embodiment, the protonated polyethylenimine has a formula (ii):

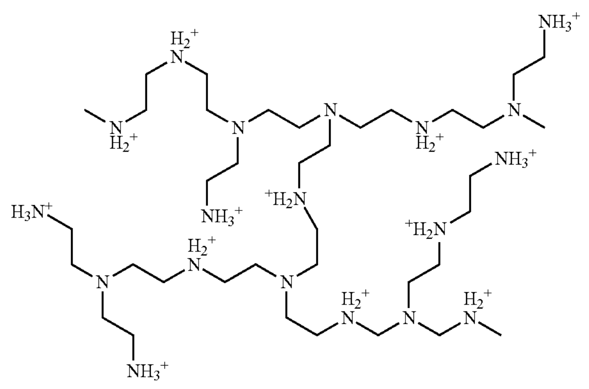

Although the polyethylenimine's branched chains are fully protonated in several embodiments of the silica inhibitor, it will be appreciated that the high-density cationic state may be achieved in other embodiments without protonating every primary amine and secondary amine in the branched chains.

By protonating nitrogen sites on the polyethylenimine, the charged ions at these nitrogen sites can interact with Si—O bonds, thereby creating a strong binding that neutralizes Si—O to Si—O interactions and inhibits the silica polymerization process. The presence of multiple charged ions on branches of the polyethylenimine allows the molecule to interact with more than one silica at a time. This charge density and surface modification increases wettability of the silica and introduces favorable rheological properties to fluids in the treated system by, for example, increasing their ability to flow under anticipated conditions.

In some embodiments, the polyethylenimine may be blended with one or more additional components to obtain the silica inhibitor. In one embodiment, the silica inhibitor includes a phosphonate blended with the polyethylenimine. By way of further example, the silica inhibitor may include a linear polymer, such as a linear polymer synthesized from polyvinyl alcohol or from polyacrylic acid. The silica inhibitor of other embodiments includes at least one architectured material, where suitable architectured materials include star-shaped and hyperbranched polymers and dendrimers. Examples of architectured materials for inclusion in the silica inhibitor include but are not limited to a polythiophene dendrimer, a polyglycerol dendrimer, and a polyethylene dendrimer.

In another aspect, a method of reducing silica levels in a system includes the steps of obtaining the silica inhibitor and treating the system with the silica inhibitor. The system into which a silica inhibitor is injected, in various embodiments, is an aqueous system. The term "aqueous system" as used herein refers to tanks, reservoirs, wells, equipment, piping, chambers, reactors, vessels, or other facilities that hold, process or transport an aqueous-based fluid, which refers to any fluid having more than 50 wt. % or more than 50 vol. % water. Aqueous-based fluids include, but are not limited to, water, blowdown, brine, seawater, and combinations thereof. In a non-limiting embodiment, the aqueous-based fluid may circulate through one or more aqueous systems including but not limited to a cooling tower, a cooling water system, an evaporation system, a boiler or boiler water system (e.g., a once-through steam generator (OTSG) boiler), an air-conditioning system, a wastewater treatment system, a deionized water system, a gas or fluid scrubbing system, and a gas or fluid absorption system. Silica inhibitor formulated in accordance with exemplary embodiments may be introduced or added to the aqueous system when the system is either shutdown or in operation.

In one embodiment, the silica inhibitor is injected into the aqueous system in a concentration range between about 10 ppm to about 1,000 ppm based on the demands of the aqueous system. In another embodiment, the silica inhibitor is injected in a concentration range of between about 250 ppm to about 750 ppm. In yet another embodiment, 550 ppm of the silica inhibitor is injected into the aqueous system.

Example 1

Several tests were performed to determine the effectiveness of various silica inhibitors. The samples in the following table were prepared at eight different concentrations for these tests: 1.5 μm, 2 μm, 2.5 μm, 3 μm, 5 μm, 10 μm, 15 μm, and 20 μm. Except for Sample 1 (the blank) all samples had the same active dosages.

| SAMPLE NO. | SILICA INHIBITOR |
|---|---|
| 1 | Blank |
| 2 | Known scale inhibitor #1 - Linear polymer based on polyvinyl alcohol (PVA) |
| 3 | Known scale inhibitor #2 - Linear polymer based on polyacrylic acid (PAA) |
| 4 | Polyethylenimine (PEI) with molecular weight 1,200 (low MW) |
| 5 | PEI with molecular weight 10,000 (high MW) |
| 6 | Combination of linear polymer (low molecular weight polycarboxylate) and dendrimer (4-tert-Butylcalix[4]arene), 550 ppm (1:1 ratio, 275:275 ppm) |
| 7 | Combination of Sample 5 (PEI with high MW) and Sample 2 (linear polymer of PVA), 550 ppm (2:1 ratio, 367:183 ppm) |
| 8 | Combination of linear polymer (low molecular weight polycarboxylate) and dendrimer (4-tert-Butylcalix[4]arene), 550 ppm (2:1 ratio, 367:137.5 ppm) |
| 9 | Combination of linear polymer (low molecular weight polycarboxylate) and dendrimer (4-tert-Butylcalix[4]arene), 550 ppm (1:2 ratio, 137.5:367 ppm) |
| 10 | Combination of linear polymer (low molecular weight polycarboxylate) and dendrimer (4-tert-Butylcalix[4]arene), 550 ppm (3:1 ratio, 412.5:137.5 ppm) |

Figure 2:
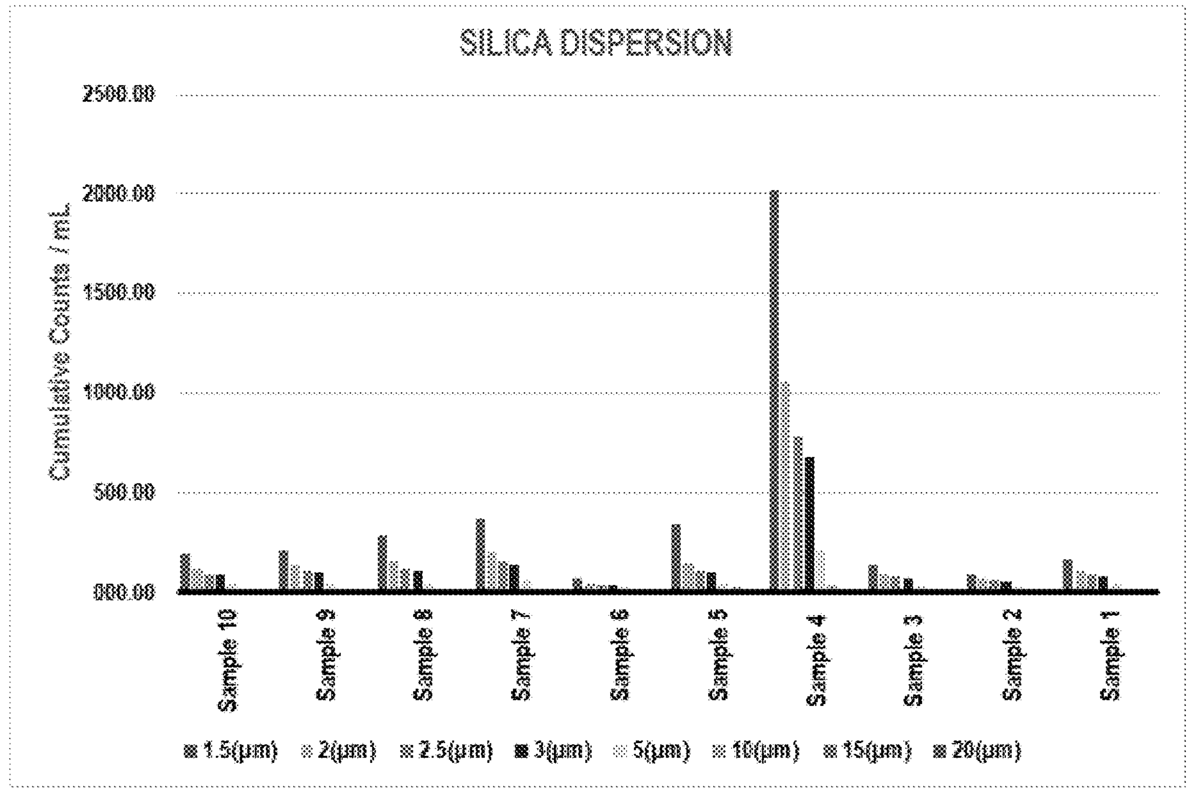
FIG. 2 is a graph depicting levels of silica dispersion resulting from treatment with different silica inhibitors.

For each sample, the silica inhibitor was introduced into a sample containing silica at 550 ppm based on the silica level. FIG. 2 depicts the resulting cumulative particle size count for silica, where a higher cumulative count indicated greater dispersion of silica. The polyethylenimine of Sample 4 demonstrated notable silica dispersion compared to the other samples, suggesting that the branched polyethylenimine is more effective than linear polymers at dispersing silica and inhibiting silica scale formation. The performance of Sample 4 compared to Sample 5 further suggests that silica inhibition is most effective with a lower molecular weight. This performance is attributed to better interactions with oligomeric or small polymeric states of silica in the interstices of the polyethylenimine when the polymer has a lower molecular weight.

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, polyethylenimine of different molecular weights, additional components of the silica inhibitor, treatment procedures, concentrations, proportions, dosages, and amounts not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed. As used herein, the singular forms "a," "an," and "the" are intended to include the plural forms as well, unless the context clearly indicates otherwise. As used herein, the term "about" in reference to a given parameter is inclusive of the stated value and has the meaning dictated by the context (e.g., it includes the degree of error associated with measurement of the given parameter, i.e., ±5% of the stated value). As used herein, the term "and/or" includes any and all combinations of one or more of the associated listed items.

The invention claimed is:

1. A method for reducing silica levels in an aqueous system, the method comprising the steps of:

obtaining a silica inhibitor, wherein the silica inhibitor comprises a branched polyethylenimine; and
treating the aqueous system with the silica inhibitor.

2. The method of claim 1, wherein the step of obtaining the silica inhibitor further comprises the step of protonating the branched polyethylenimine to attain a charged inhibitor with a high-density cationic state.

3. The method of claim 1, wherein the step of obtaining the silica inhibitor further comprises the step of blending the branched polyethylenimine with a phosphonate.

4. The method of claim 1, wherein the step of treating the system with the silica inhibitor further comprises the step of injecting into the aqueous system an amount of the silica inhibitor between about 10 ppm to about 1,000 ppm.

5. The method of claim 1, wherein the step of treating the system with the silica inhibitor further comprises the step of injecting the silica inhibitor into the aqueous system in an amount sufficient to create a concentration of the silica inhibitor in the aqueous system of between about 250 ppm and about 750 ppm.

6. The method of claim 1, wherein the step of treating the aqueous system with the silica inhibitor further comprises the step of injecting the silica inhibitor into a cooling water system.

7. The method of claim 1, wherein the step of treating the aqueous system with the silica inhibitor further comprises the step of injecting the silica inhibitor into a boiler system.

8. A method of preparing a silica inhibitor comprising the steps of:
obtaining a branched polyethylenimine; and
protonating the branched polyethylenimine to attain a charged inhibitor with a high-density cationic state.

9. The method of claim 8 further comprising the step of blending the branched polyethylenimine with a phosphonate.

10. The method of claim 8 further comprising the step of blending the branched polyethylenimine with an architectured material selected from the group consisting of star polymers, hyperbranched polymers, and dendrimers.

11. The method of claim 8 further comprising the step of blending the branched polyethylenimine with a linear polymer based on polyvinyl alcohol.

12. The method of claim 8 further comprising the step of blending the branched polyethylenimine with a linear polymer based on polyacrylic acid.

13. A silica inhibitor comprising:
a branched polyethylenimine; and
a phosphonate.

14. The silica inhibitor of claim 13, wherein the branched polyethylenimine comprises at least one protonated primary amine and at least one protonated secondary amine.

15. The silica inhibitor of claim 13, wherein the polyethylenimine has a molecular weight of between about 300 g/mol to about 100,000 g/mol.

16. The silica inhibitor of claim 13, wherein the polyethylenimine has a molecular weight of between about 600 g/mol to about 1,800 g/mol.

17. The silica inhibitor of claim 13, wherein the polyethylenimine has a molecular weight of about 1,200 g/mol.

18. The silica inhibitor of claim 13 further comprising a linear polymer based on polyvinyl alcohol.

19. The silica inhibitor of claim 13 further comprising a linear polymer based on polyacrylic acid.

20. The silica inhibitor of claim 13 further comprising an architectured material selected from the group consisting of star polymers, hyperbranched polymers, and dendrimers.

* * * * *